United States Patent

Kitagawa et al.

Patent Number: 6,008,783
Date of Patent: Dec. 28, 1999

[54] KEYBOARD INSTRUMENT WITH THE DISPLAY DEVICE EMPLOYING FINGERING GUIDE

[75] Inventors: Hiroshi Kitagawa, Iwata; Masahito Kinpara, Hamamatsu, both of Japan

[73] Assignee: Kawai Musical Instruments Manufacturing Co. Ltd., Japan

[21] Appl. No.: 08/862,197

[22] Filed: May 23, 1997

[30] Foreign Application Priority Data

May 28, 1996 [JP] Japan .................................. 8-154785

[51] Int. Cl.⁶ .............................. A63J 17/00; G09B 15/06; G09G 3/14
[52] U.S. Cl. ............................. 345/39; 84/464 A; 84/478
[58] Field of Search .......................... 345/83, 39; 84/478, 84/477, 470, 601, 658

[56] References Cited

U.S. PATENT DOCUMENTS

| | | | |
|---|---|---|---|
| 3,837,256 | 9/1974 | Gullickson | 84/478 |
| 4,422,365 | 12/1983 | Iwaki | 84/478 |
| 4,516,465 | 5/1985 | Kani | 84/478 |
| 5,107,743 | 4/1992 | Decker | 84/478 |
| 5,247,864 | 9/1993 | Konishi | 84/477 |
| 5,394,784 | 3/1995 | Pierce et al. | 84/464 A |
| 5,495,072 | 2/1996 | Kumagi | 84/601 |
| 5,567,902 | 10/1996 | Kimble et al. | 84/658 |
| 5,656,789 | 8/1997 | Nakada et al. | 84/477 R |
| 5,841,051 | 11/1998 | Segan | 84/477 |

FOREIGN PATENT DOCUMENTS

| | | |
|---|---|---|
| 63-12362 | of 0000 | Japan . |
| 63-21903 | of 0000 | Japan . |
| 7-92965 | of 0000 | Japan . |
| 60-111280 | 6/1985 | Japan . |
| 3089466 | 9/1991 | Japan . |
| 6230773 | 8/1994 | Japan . |
| 7261750 | 10/1995 | Japan . |
| 7334073 | 12/1995 | Japan . |
| 8076750 | 3/1996 | Japan . |

Primary Examiner—Bipin Shalwala
Assistant Examiner—David L. Lewis
Attorney, Agent, or Firm—Christie, Parker & Hale, LLP

[57] ABSTRACT

A display device displaying a plurality of information sets with a simple structure, and a keyboard instrument that has a key guide device including such a display device. The display is driven at cycles shorter than those discernible by human beings, and the time ratio of ON period to OFF period for the display is changed based on control data. More specifically, the ON state and OFF state are inverted each drive cycle, or the number of cycles during which the display is in ON or OFF state can selected, or the drive cycles are cyclically changed to turn ON the display means only in a designated cycle. In this manner, the luminance of and the hues of the display can be changed relative to the continuous lighting, and a plurality of information sets can be displayed based on this change. This display device may be employed as a fingering guide display device for a keyboard instrument, and position data for keys to be depressed and other playing guide information are displayed at the same time.

19 Claims, 8 Drawing Sheets

FIG. 14
PRIOR ART
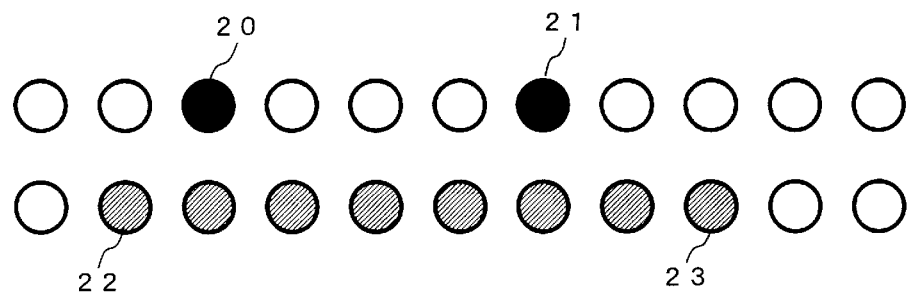
FIG. 15
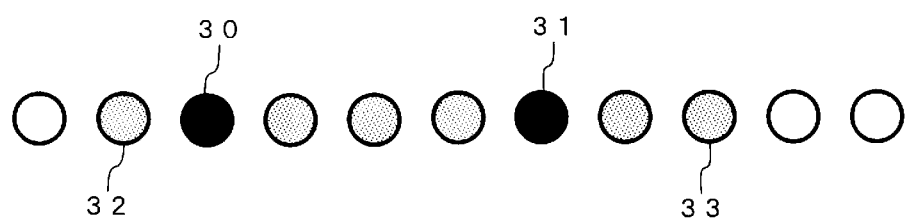
FIG. 16
| DISPLAY PHASE COUNTER VALUE C | | 2 | 0 | 1 | 2 | 0 | 1 | 2 | 0 | 1 | 2 | ...... |
|---|---|---|---|---|---|---|---|---|---|---|---|---|
| CYCLE T | | T3 | T1 | T2 | T3 | T1 | T2 | T3 | T1 | T2 | T3 | ...... |
| CYCLE COUNTER VALUE | 5-C | 3 | 2 | 1 | 0 (→3) | 2 | 1 | 0 (→3) | 2 | 1 | 0 (→3) | ...... |
| | 3-C | 1 | 0 (→3) | 2 | 1 | 0 (→3) | 2 | 1 | 0 (→3) | 1 | 0 (→3) | ...... |
| | 4-C | 2 | 1 | 0 (→3) | 2 | 1 | 0 (→3) | 2 | 1 | 0 (→3) | 2 | ...... |

KEYBOARD INSTRUMENT WITH THE DISPLAY DEVICE EMPLOYING FINGERING GUIDE

BACKGROUND OF THE INVENTION

1. Field of the Invention

The present invention relates to a display device and a keyboard instrument that employs the display device, and in particular to a display device, which has a simple structure and which employs a simple process, that can control the display luminance and hues, and to a keyboard instrument that employs the display device as a fingering guide display.

2. Description of the Related Art

Conventionally, proposed are keyboard instruments, such as acoustic pianos, electronic pianos and muffled sound pianos having both of said functions, equipped with key depression display devices, which provide for each key an LED (light emitting diode) and by which keys to be depressed are displayed at predetermined tempos in consonance with performance data. In the keyboard instrument having such a key depression display device, performance data stored in a storage device, or performance data received from an external device, such as a MIDI sequencer, are employed to display the positions of keys that are to be depressed. As the key display device has a plurality of LEDs that correspond to individual keys for displaying the positions of keys that are to be depressed and for displaying, for example, fingering data (finger data indicating the positions of the hands and the fingers to be used for key depression) and touch data, individual LEDs are employed to display these data respectively.

FIG. 14 is a diagram for explaining a conventional display example of a key depression display device. The key depression display device has red LEDs on the upper array and green LEDs on the lower array that correspond to the individual keys. Red LEDs 20 and 21 on the upper array, for example, indicate the positions of keys to be depressed in consonance with performance data, and green LEDs 22 through 23 at the lower array indicate fingering information.

Since a conventional key depression display device has separate displays for displaying individual data for a plurality of information sets, the device is complicated and expensive.

SUMMARY OF THE INVENTION

It is an object of the present invention to provide a display device having a simple structure that can display a plurality of information sets, and a keyboard instrument having a key depression guide device that employs such a display device.

According to the present invention, a display that can be turned on/off at high speed is employed. For the display, any OFF period between two successive ON periods is set to be short enough for human eyes not to discern flicker of light emission. The ON/OFF state is inverted for each drive cycle in consonance with control data, or the display is set on or off at periods that correspond to a predetermined count for the drive cycles, so that the timing for the ON cycle or the OFF cycle can be varied. Either this, or the drive cycle is changed cyclically and the display means is turned on or off only at a designated cycle, so that the luminance or the hue of the display is changed.

In another feature of this invention, a display device comprising light emitting display means, that includes a plurality of light emitting elements for emitting differently colored lights, drive means for independently driving said light emitting elements that are selected, and control means for controlling said drive means so that, in consonance with a light emission characteristic instruction, a current supplied to said light emitting elements is set to one of a plurality of predetermined values.

The display device is used as a fingering guide display device for a keyboard instrument, and position information for keys to be depressed, and the other playing guide information can be displayed at the same time.

With the above arrangement, according to the present invention, the luminance and the hue of a display can be controlled using a simple structure, and a plurality of information sets can be displayed by, for example, changing a time ratio for an ON period for a single LED. When this display device is adopted as a fingering guide display device, performance information, such as position information for a key that is to be depressed, touch information and fingering information, can be displayed at the same time using a simple structure.

BRIEF DESCRIPTION OF THE DRAWING

FIG. 14 is an explanatory diagram showing a display example of a conventional key depression display device;

FIG. 15 is an explanatory diagram showing a display example of a fingering guide display device according to the present invention; and FIG. 16 is a diagram showing the relationship of a change in a cycle counter value, a change in a display phase counter value, and a cycle.

DETAILED DESCRIPTION OF THE PREFERRED EMBODIMENT

Figure 1:
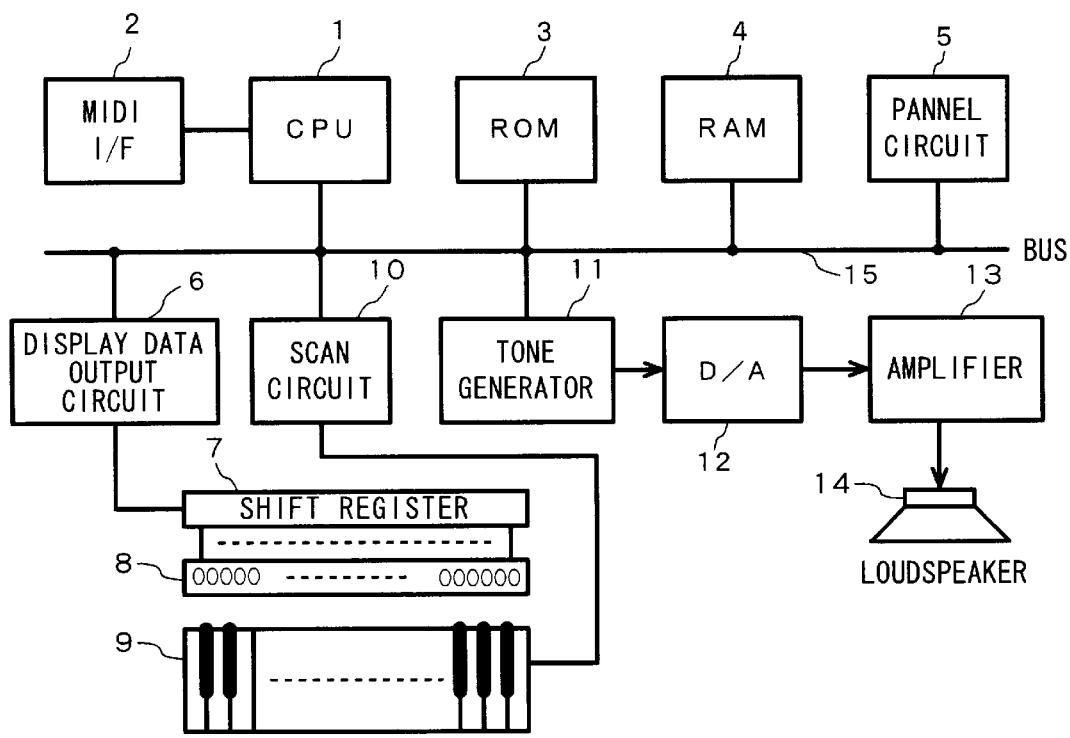
FIG. 1 is a block diagram illustrating the arrangement of an electronic piano according to the present invention.

The preferred embodiments of the present invention will now be described with reference to the accompanying drawings. FIG. 1 is a block diagram illustrating an electronic piano according to the present invention, the same basic structure as that of a muffled sound piano. A CPU 1 controls the entire electronic piano in consonance with a control program stored in a ROM 3. The CPU 1 has a serial port for connection with a timer interrupt circuit and a MIDI interface circuit 2. The MIDI interface circuit 2 is an electronic circuit for exchanging MIDI message with an external MIDI device.

A control program, a timbre parameter, performance data, etc., are stored in the ROM 3. The timbre parameter includes waveform address data and envelope control data stored in a waveform memory.

A RAM 4 is used as a work area and as a buffer, and may be backed up by a battery. A panel circuit 5 includes various switches for timbre selection, etc., a display device for displaying characters by using a liquid crystal or an LED, and their interface circuits.

A keyboard 9 has a plurality of keys, each of which can have two switches, for example. A scan circuit 10 scans the switch states of the individual keys, detects changes in the states, and generates a key event (key ON or key OFF) data and touch (velocity) data. A fingering guide display device 8 includes a plurality of LEDs corresponding to the individual keys on the keyboard 9. The LEDs may emit a single kind of color or a plurality of colors, such as red and green. To emit a plurality of colors, an LED display having a plurality of LED elements can be employed, and a driver (shift register) must be provided for each LED element when using such LED display.

A shift register 7 receives and holds display control data that is generated by the CPU 1, and drives the LED elements. The shift register 7 has the same number of stages as the number of LED elements. When, for example, there are 88 LED elements, an 88-stage shift register is prepared. The output terminals of the shift register 7 are connected to one terminal of the LED elements, and the other terminal of the LED elements are connected to a 5 V power source (not shown) via a resistor. Thus, when a display control bit transmitted to the shift register 7 is 0, an LED is turned on, while when the bit is 1, it is turned off.

A display data output circuit 6 has a signal transmission shift register (not shown). Under the control of the CPU 1, display control bit data corresponding to the LED elements are outputted as series signals, and shift pulses for the shift register 7 are outputted synchronously with those signals. Therefore, during one transfer of display control data, 88 sets of display control bit data and shift pulses are outputted. The transfer speed is preferably several hundreds kilo-bits per second or higher, so that flicker of the display during the transfer cannot be discerned by a user's eyes. When the shift register 7 includes a parallel buffer for latching data that is set to it, a low speed data transfer is enabled. The data transfer cycle is controlled by software that will be described later.

A tone generator 11 is a circuit to generate a desired tone signal in a waveform reading method. For example, from a waveform memory in which are stored digital tone waveform sampling values, waveform data is sequentially read out at an address interval that is proportional to a pitch to be produced. Interpolation calculation on the data read out is performed and a tone waveform signal is generated. The tone generator 11 has an envelope generator, too. An envelope signal that is produced based on a predetermined envelope parameter is multiplied by a waveform tone signal, and a musical tone signal is outputted. Although the tone generator 11 has a plurality (e.g., 32) of tone generation channels, practically, a single tone generator circuit is multiplexed in a time sharing manner, so that a plurality of musical tone signals can be independently generated at the same time.

A D/A converter 12 converts a digital tone signal into an analog signal, and outputs it to an amplifier 13. The tone signal is amplified by the amplifier 13 and released through a loudspeaker 14 as the musical tone. A bus 15 interconnects the individual circuits in the electronic piano. As needed, a memory card interface circuit and/or a floppy disk drive may be provided.

Figure 2A:
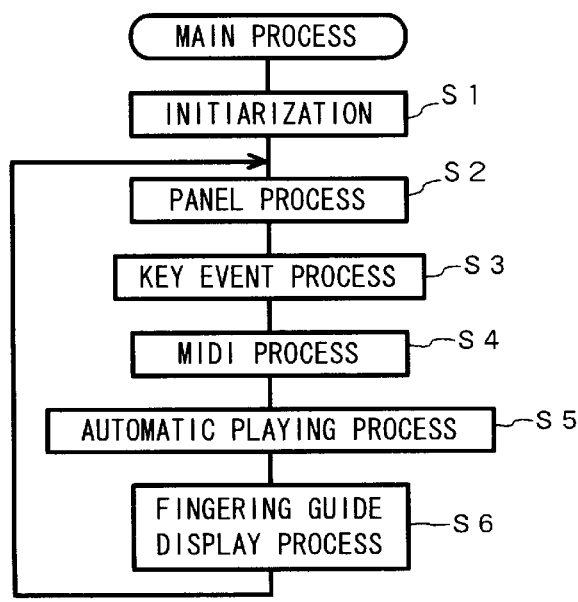
FIGS. 2A and 2B are flowcharts for the main process for a CPU and a timer interrupt process according to the present invention.

FIG. 2A is a flowchart showing the main process for the CPU 1. At step S1, the RAM 4 and the tone generator 11 are initialized. At step S2, the state of the switches on the panel circuit 5 is examined to determine whether it has changed. When a change in the switch state is detected, a process corresponding to the state change is performed.

At step S3, a check is performed to determine whether or not a key event has occurred, i.e., whether the switch states of the individual keys have changed. When the result is affirmative, a well-known key event process is performed. In other words, for key-ON data, a tone generation channel is assigned and a necessary tone parameter is set to the tone generation channel to begin tone production. For the key-OFF data, the level of a tone to be outputted is attenuated and a tone generation channel is released.

At step S4, a check is performed to determine whether or not a MIDI message has been received from an external device. When a message signal has been received, a tone generation process is performed in the same manner as is the process for the occurrence of a key event. At step S5, an automatic playing process is performed based on performance data stored in the RAM 4 or the ROM 3. For the automatic playing process, a timing counter, or an automatic play timer, is proportionately incremented in accordance with a predetermined tempo. The automatic playing timer value is compared with timing information for each tone generation data in performance data, and a tone generation process is performed with the data for which the timing equals the tone generation timing. In the MIDI process and the automatic playing process, a mode in which only fingering is displayed without tone production may be provided.

At step S6, the fingering guide display process is performed. For the fingering guide display process, during the automatic playing employing, for example, performance data which is inputted in real time from an external MIDI sequencer, or automatic performance data which is stored in an internal memory, not only position data for a key to be depressed but also other performance data, for example, fingering data such as position data for hands and finger data, and touch data are displayed on the fingering guide display device 8. The information to be displayed are included in the performance data in advance.

Figure 2B:
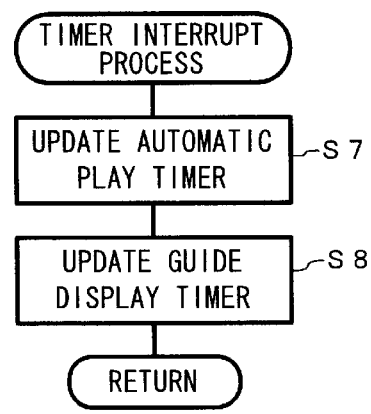

FIG. 2B is a flowchart for a timer interrupt process. This process is incorporated in the program for the CPU 1 and is activated when a timer interrupt circuit issues an interrupt in consonance with a predetermined cycle. At step S7, the automatic play timer is updated. More specifically, a value that is proportional to a predetermined tempo value is added to an automatic play timer value that is stored in a given area in the RAM 4. At step S8, a guide display timer value T is updated.

The guide display timer value T is used to count drive cycles for the LEDs of the fingering guide display device 8. In the same manner as for the automatic play timer value, a value that is set in advance is added to the guide display timer value T that is stored in a given area in the RAM 4.

Figure 3:
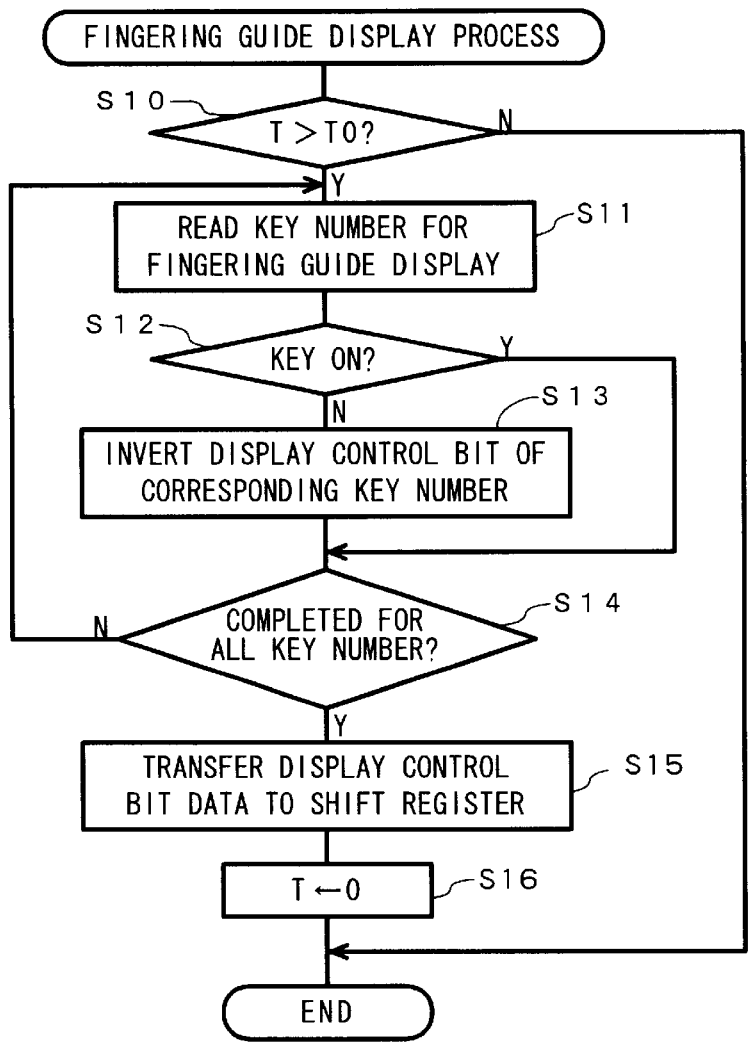
FIG. 3 is a flowchart for a guide display process at step S6 of FIG. 2A.

FIG. 3 is a flow chart for the guide display process at step S6 in FIG. 2A. At step S10, a check is performed to determine whether the guide display timer value T is greater than a predetermined value T0 (e.g., a value corresponding to 20 milliseconds). When the result is affirmative, program control moves to step S11. At step S11, one key number for which the fingering guide is to be displayed is read out from predetermined area R (shown in FIG. 4B) in the RAM 4. The registration and the updating of the key number in the area R are performed when the fingering display data is received during the MIDI process at step S4, or it is read out during the automatic playing process at step S5. At this time, all the LED display control bits corresponding to the old fingering display key number are set to 1 (OFF).

At step S12, a check is performed to determine whether the key number read out is for a key in the ON state. Only when the result is negative, the process at step S13 is performed. When the key number is for a key in the ON state, step S13 is skipped, so that the LED that corresponds to the key in the ON state is turned on at a higher luminance than is the LED for the fingering display (display of the hand position). The key numbers of keys in the ON state in area Q (see FIG. 4B) that are referred to are those for keys that are depressed in consonance with the MIDI process or the automatic playing process, and do not include keys that are in the ON state in consonance with the key event. LED display control bit data are stored in the memory area in FIG. 4A. To turn on at a higher luminance LEDs that correspond to keys in the ON state, the corresponding LED display control bits are set to 0 (ON) in the key-ON state while to 1 (OFF) in the key-OFF state.

Figure 4A:
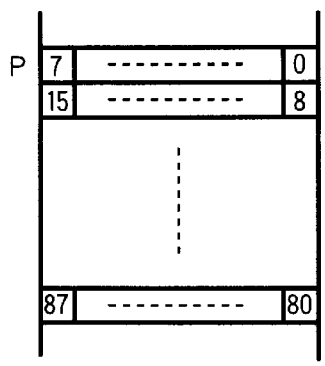
FIGS. 4A and 4B are explanatory diagrams showing control data formats in a RAM.
Figure 4B:
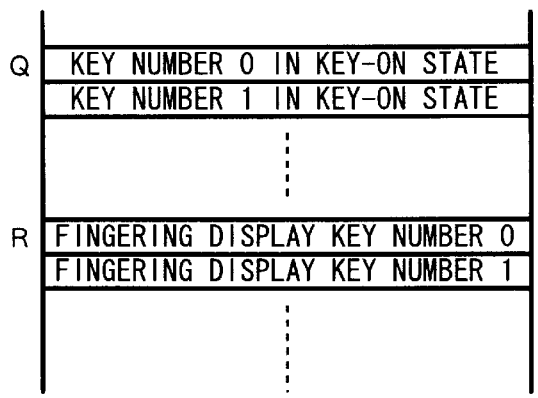

At step S13, the value of an LED display control bit corresponding to a key number is inverted. More specifically, when the control bit value is 0 (ON), it is rewritten as 1 (OFF) and vice versa. At step S14, a check is performed to determine whether or not the processing has been completed for all the fingering display key numbers that are registered in the area R. When the result is negative, program control returns to step S11. When the result is affirmative, program control advances to step S15. At step S15, the LED display control bit data in FIG. 4A is transferred to the shift register 7 via the display data output circuit 6, and thus the display data is updated. At step S16, the guide display timer value T is reset to 0.

Figure 5:
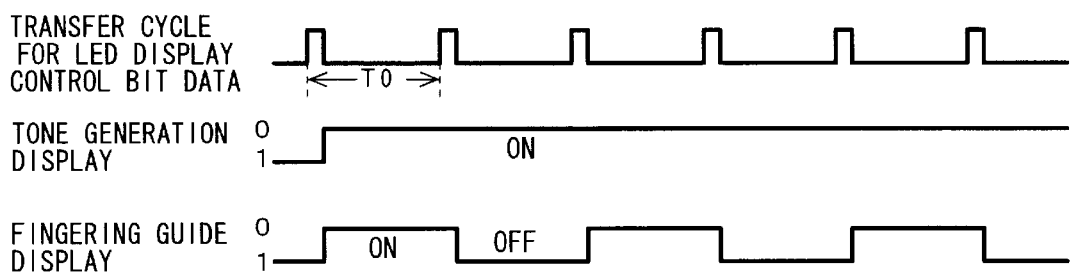
FIG. 5 is a timing chart showing a fingering guide display operation.

FIG. 5 is a timing chart for a fingering guide display operation. LED display control bit data are transferred in consonance with predetermined cycle T0 (e.g., 20 milliseconds). For a tone generation display (display of a key to be depressed), an LED is turned on at a time when a key should be depressed (the high level state in FIG. 5 is supposed to be ON), and is kept on until the key-OFF time. For a fingering guide display, since the LED is intermittently turned on in every other cycle which the LED display control bit data is transferred, the luminance of the LED is reduced to half of it when the LED is continuously on for the tone generation display, so that the fingering guide display can be distinguished from the tone generation display. From the viewpoint of the time ratio of the ON period for the LED to the OFF period, the continuous ON period for the tone generation display corresponds to 100% of the time ratio for the ON period, while the turning on of the LED for the fingering guide display corresponds to 50% of the time ratio.

FIG. 15 is a diagram showing a display example of a fingering guide display device of the present invention. Since LEDs 30 and 31 for indicating the positions for keys to be depressed are turned on continuously, they have high luminance. As is explained while referring to FIG. 5, LEDs (other than the LEDs 30 and 31, within a range extending from an LED 32 through an LED 33) are driven during only half the period of a continuous ON period and their luminance are reduced, so that the LEDs 30 and 31 can be easily distinguished from the other LEDs. With such an arrangement and operation, a plurality of sets of data can be displayed on the basis of the luminance differences between a single set of LEDs each having only one color.

A second embodiment of the present invention will now be described. In the first embodiment, when the luminance of an LED is reduced, it is set to half of that provided during a continuous ON period. In the second embodiment, an LED is turned on or off only one time during N cycles (N is a natural number), so that the luminance can be controlled as 1/N or (N−1)/N.

Figure 7:
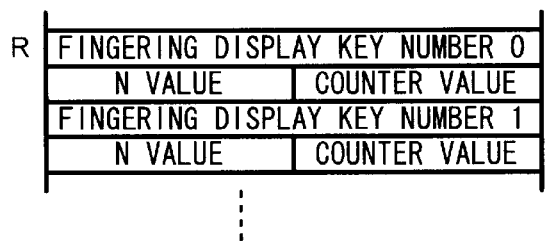
FIG. 7 is a diagram for explaining a format in a fingering display key number storage area R in the second embodiment.

FIG. 7 is a diagram showing the format for fingering display key number storage area R in the second embodiment. Data areas "N value" and "counter value" are added to the fingering display key number data shown in FIG. 4B. A natural number is set as an N value in consonance with the luminance that is to be displayed. With an N value of 3, an LED is turned on for one cycle in each three cycles, and its luminance is ⅓ that of a continuous ON period. The counter value is used for indicating the current N value.

Figure 6:
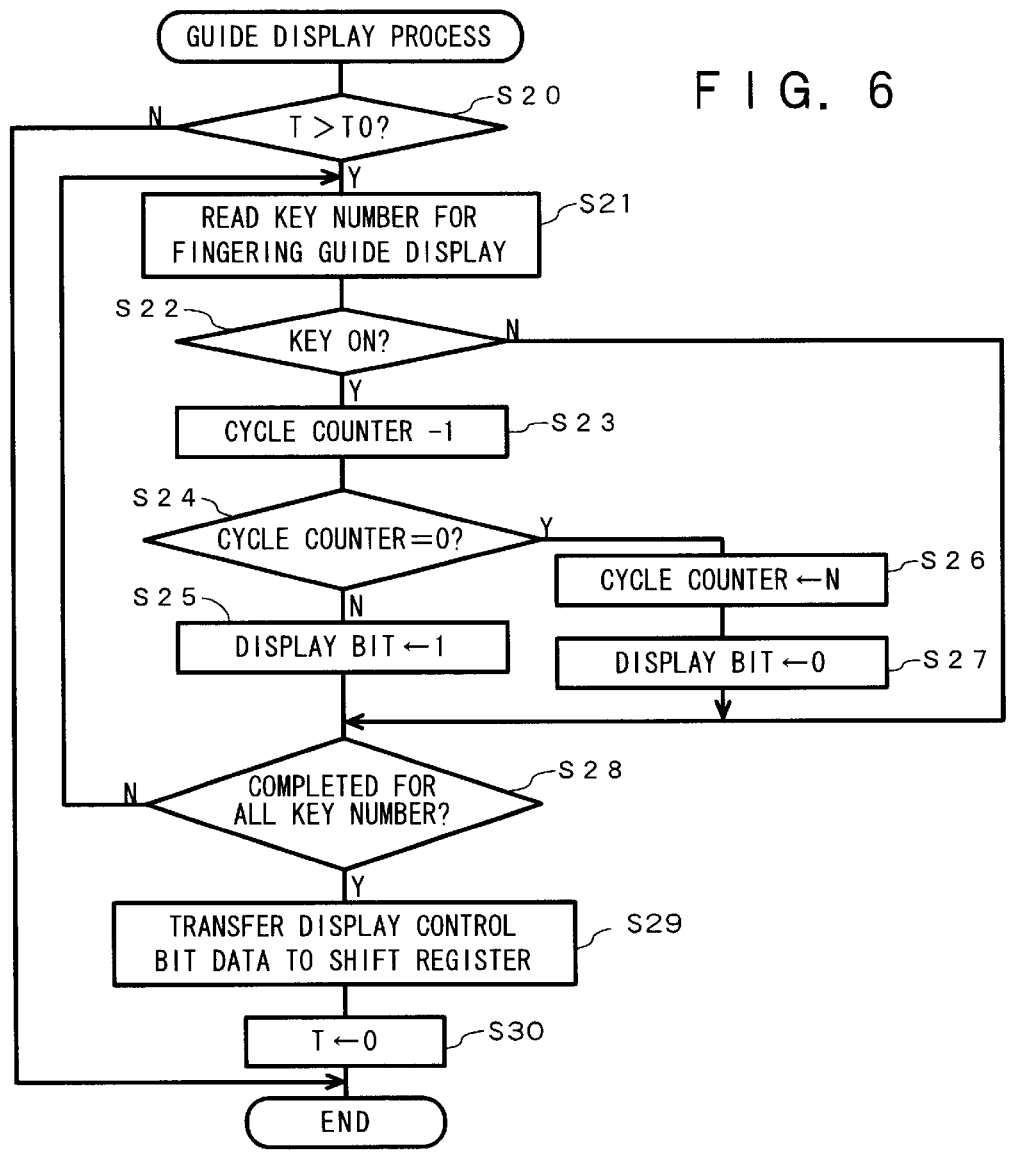
FIG. 6 is a flowchart showing a guide display process according to a second embodiment of the present invention.

FIG. 6 is a flowchart for a guide display process according to the second embodiment. The processing at steps S20 through S22 is the same as that at steps S10 through S12 in FIG. 3. At step S23, a cycle counter value that accompanies each fingering display key number, or the counter value in the area R in FIG. 7, is decremented by one.

At step S24, a check is performed to determine whether or not the cycle counter value is 0. When the result is affirmative, program control moves to step S26. When the decision at step S24 is negative, program control advances to step S25, and a corresponding LED display control bit is set to 1 (OFF). At step S26, the N value in the fingering display key number storage area R is set as the cycle counter value. At step S27, a corresponding LED display control bit is set to 0 (ON). In other words, the cycle counter value is cyclically decremented beginning with the N value, and only when the cycle counter value is 0 is the LED turned on. The processing at steps S28 through S30 is the same as that at steps S14 through S16 in FIG. 3.

Figure 8:
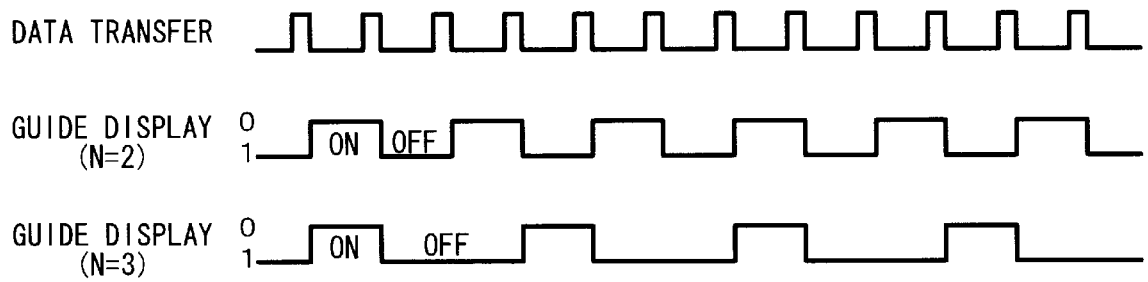
FIG. 8 is a timing chart for a fingering guide display operation according to the second embodiment.

FIG. 8 is a timing chart for the fingering guide display operation according to the second embodiment. In the second embodiment, when the N value is 2, the turning on and off function is repeated for each transfer cycle, and the luminance is reduced to half. In other words, the condition is the same as in the first embodiment. With the N value of 3, the LED is turned on only for one cycle in every three cycles, and its luminance is reduced to ⅓. In this fashion, the luminance can be controlled at many levels by changing the N value.

It is not specified that only one of the N cycles is an ON or OFF period, but generally, it can be specified that "a cycle count equivalent to a predetermined second number n is determined to be ON or OFF period during a cycle count equivalent to a predetermined first number N." When the process at step S25 is exchanged with the process at step S27, an LED can be turned off for only one cycle in every N cycles. In this case, the luminance is (N−1)/N times that for the continuous ON period.

A third embodiment of the present invention will now be explained with referring to FIGS. 9, 10 and 11. According to the third embodiment, a long transfer cycle T2 and a short transfer cycle T1 for display control bits are alternately located, and the cycle in which an LED should be turned on is determined by the initial value of the display control bits. As a result, three luminance levels, including one for the continuous ON period, can be selected.

Figure 9:
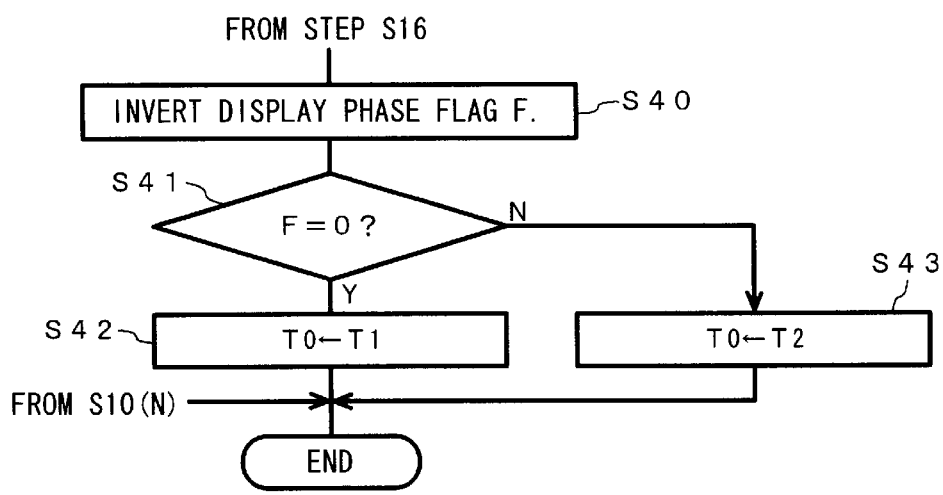
FIG. 9 is a flowchart for the essential portion of a guide display process according to a third embodiment of the present invention.

FIG. 9 is a flowchart for the essential portion of a guide display process according to the third embodiment. In the guide display process in FIG. 9, the processing at steps S10 through S16 in FIG. 3 in the first embodiment are performed in the aforementioned manner, and program control moves to step S40.

At step S40, a value of a display phase flag F that is provided in a predetermined area of the RAM 4 is inverted. The display phase flag F sets a drive cycle in order to identify the length of the cycle. When the flag F is 0, a short drive cycle T1 is selected, while when the flag F is 1, the long drive cycle T2 is selected. At step S41, a check is performed to determine whether or not the value of the flag F is 0. When the decision is affirmative, program control moves to step S42 where the value T0 for determining the drive cycle is set to T1. When the decision is negative in step S41, program control moves to step S43 where the value T0 is set to T2 (T2 >T1). Through this process, as shown in FIG. 11, long cycle T2 and short cycle T1 alternate.

Figure 10:
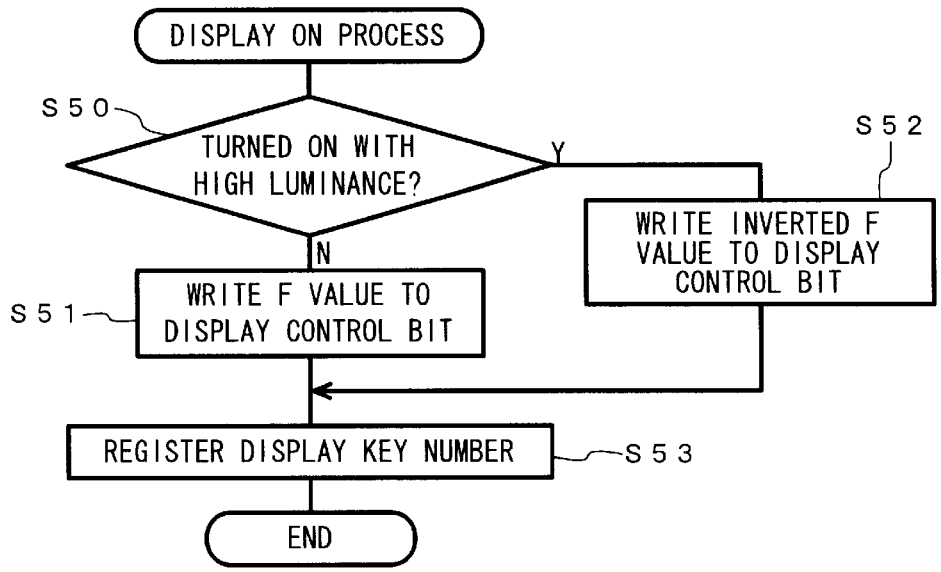
FIG. 10 is a flowchart showing a display ON process based on fingering guide display data during a MIDI process or an automatic playing process.

FIG. 10 is a flowchart for a fingering display ON process based on fingering guide display data obtained during the MIDI processing or the automatic playing processing. In this example, it is assumed that fingering display data for the right hand are indicated by a high luminance, while fingering display data for the left hand are indicated by a low luminance. At step S50, a check is performed to determine whether or not an LED is turned on at a high luminance level, depending on whether or not the fingering display data is for the right hand. When the result is affirmative, program control moves to step S52 where an inverted value for flag F is written to the LED display control bit. When the result is negative in step S50, program control moves to step S51 where the value of flag F is written to the LED display control bit shown in FIG. 4A. At step S53, a fingering display key number is registered in the predetermined area R in the RAM 4.

Figure 11:
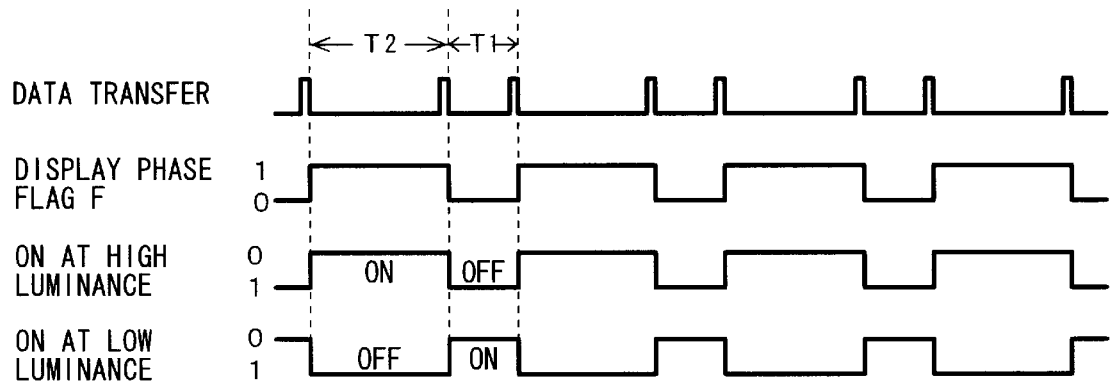
FIG. 11 is a timing chart for a fingering guide display operation according to the third embodiment.

As is shown in FIG. 11, the display phase flag F is set to 1 at cycle T2 and to 0 at cycle T1. When, in consonance with this, the same value as that for the flag F is written as the initial value for a display control bit, the control bit is set to 1 (OFF) at cycle T2, and to 0 (ON) at cycle T1. When the inverted value for the flag F is written, opposite results are obtained. Therefore, if T2 and T1 are so set that T2=2T1, the fingering display data for the right hand is displayed at ⅔ the luminance for the continuous ON period, while the fingering display data for the left hand is displayed at ⅓ of the luminance.

In general, the third embodiment can be considered to be an example where each N cycles that are set in the second embodiment has a value different each other. In other words, the third embodiment corresponds to an example where n (=1) cycle (T1 or T2) is determined to be an ON or OFF period in N (=2) cycles consisting of T1 and T2.

Finally, a fourth embodiment will now be described with reference to FIGS. 12 and 13. In the fourth embodiment, the technique of the third embodiment is applied to the second embodiment. Three or more different display cycles are provided, and the cycle at which an LED should be turned on is determined by referring to the initial value of a "counter value," which is so set that corresponds to a fingering key number.

Figure 12:
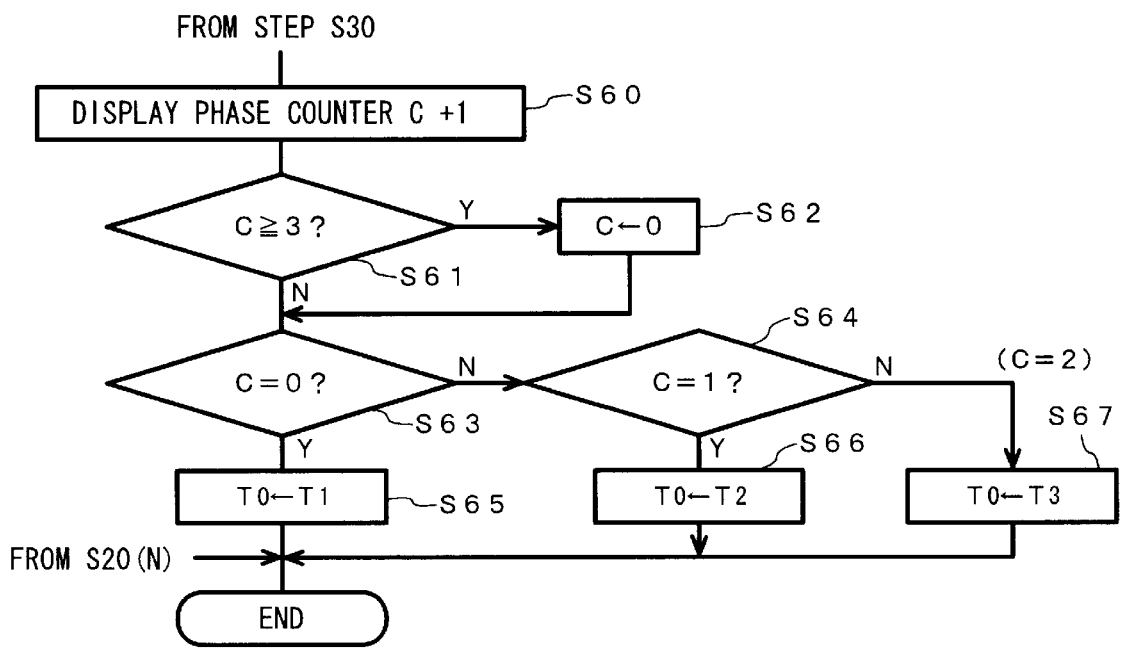
FIG. 12 is a flowchart showing the essential portion of a guide display process according to a fourth embodiment of the present invention.

FIG. 12 is a flowchart for the essential portion of a guide display process according to the fourth embodiment. In the guide display process in FIG. 12, after the processing at steps S20 through S30 in FIG. 6 are performed in the same manner as in the second embodiment, program control moves to step S60. It should be noted that the process at step S28 in FIG. 6 is performed after one of steps S65, S66 and S67 has been performed in FIG. 12.

At step S60, the value of a display phase counter C (counter value C) provided in the predetermined area in the RAM 4 is incremented by one. The counter value C is used to select one of a plurality of drive cycles having different lengths from each other. At step S61, a check is performed to determine whether the counter value C that was incremented at step S60 is three or greater. When the decision is affirmative, program control moves to step S62 and the counter value C is reset to 0.

At step S63, a check is performed to determine whether or not the counter value C is 0. When the decision is affirmative, program control advances to step S65 and the value T0 is set to T1. When the decision is negative, program control moves to step S64.

At step S64, a check is performed to determine whether or not the counter value C is 1. When the decision is affirmative, program control advances to step S66 and value T0 is set to T2. When the decision is negative, program control moves to step S67 where the value T0 is set to T3. If the values for T1, T2 and T3 are so set that T3>T2>T1, through the above process, the short cycle T1, the intermediate cycle T2 and the long cycle T3 appear cyclically. Although in this embodiment the kinds of cycles (the upper limit for counter value C) are three, the kinds of cycles are not limited to three and any desired number of cycles can be selected.

Figure 13:
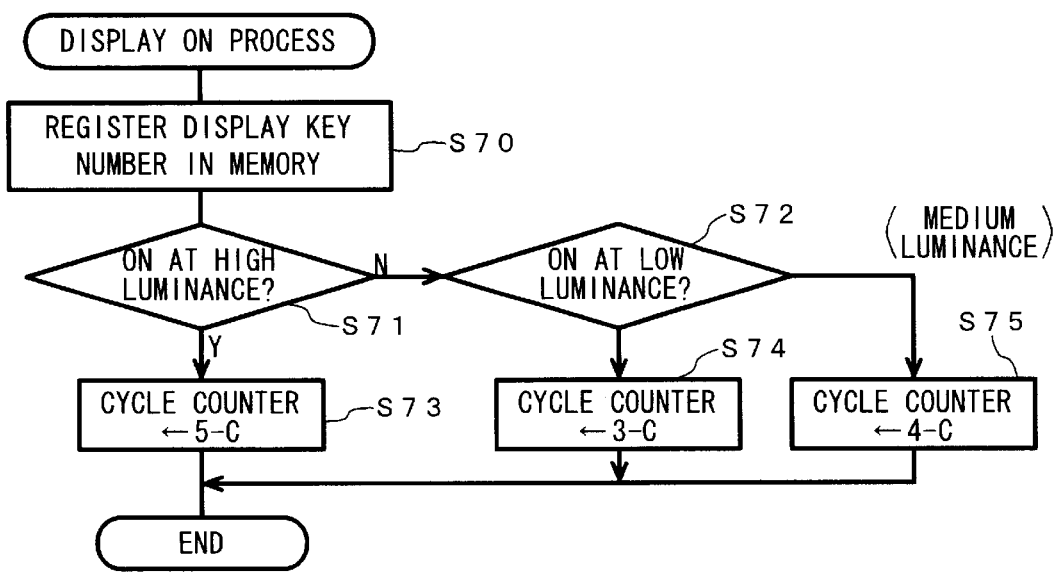
FIG. 13 is a flowchart for a display ON process based on fingering guide display data according to the fourth embodiment.

FIG. 13 is a flowchart for a fingering display ON process based on fingering guide display data during MIDI processing or automatic playing processing. Therefore, the fingering display ON process is performed before the guide display process in the main process. At step S70, a fingering display key number in the fingering guide display data is registered in the predetermined area R in the RAM 4. The format used for registration may be the same as that in the second embodiment, and since the value for N may be set as a number (3 in this example) that is equivalent to the kinds of cycles, it can be omitted.

If, at step S71, an LED should be turned on at a high luminance level in consonance with the data to be displayed, program control advances to step S73. When, at step S72, an LED is turned on at a middle luminance level, program control goes to step S75. When an LED is turned on at a low luminance, program control moves to step S74.

At steps S73, S74 and S75, the values for 5-C, 3-C and 4-C are set as initial values for the cycle counter that is corresponding to the fingering display key number (C is a display phase counter value). Through the above guide display process (FIG. 6), one of the values 5-C, 3-C and 4-C is set as the initial value for the cycle counter in consonance with a request for a display device to be turned on with a high, medium or low luminance.

FIG. 16 is a table showing the relationship between the changes in the cycle counter value and the display phase counter value C, and the cycle. When, for example, the display phase counter C is 1 and the display device is to be turned on at high luminance during the display ON process, value 5-C, i.e., 4, is set as the initial value for the cycle counter value. Since the cycle counter value, 4, is decremented at step S23 in FIG. 6, it is set to 3 when one cycle of the guide display process has been completed. When the display phase counter value C is 1 before processing shown in FIG. 12, it is incremented to 2 at step S60. Thus, after the processing in FIG. 12, cycle T3 is selected as cycle T0 (step S67). It should be noted that, at this time, the cycle counter value is not 0 and the display device is not turned on.

When the cycle counter value is decremented to 0, a display bit is set to 0 (step S27), and the display device is turned on. Once the cycle counter value has been 0, the initial cycle counter value is thereafter set to N (=3). As shown in FIG. 16, when the display device is turned on, the display phase counter value C is always 2, and the longest cycle T3 is selected as cycle T0, so that the maximum luminance is selected for the display device.

When the display device is to be turned on at low luminance and at middle luminance, 3-C and 4-C are set as the initial values of cycle counter, respectively. When the initial cycle counter value is 0, therefore, the cycles T1 and T2 are respectively selected as the cycle T0, and desired luminances can be obtained. When the initial cycle counter value is 4 or greater on the basis of the display phase counter value C, a value obtained by subtracting 3 from the counter value acquired may be employed as the initial cycle counter value. Then, a display having a desired luminance can be provided at an earlier time.

The following modification of the present invention is available.

An LED display, which serves as a display device, can be constituted by a plurality of LED elements that emit different colors each other. In this case, the ON times and OFF times for the individual LED elements are controlled in the same fashion as described above, so that the luminance of the color that is emitted by each LED element can be controlled. Since the luminances of the LED elements differ from each other, an LED display that includes such LED elements emits colors having hues that are consonant with a mixing ratio for colors having different luminances. In other words, only a single LED display having a plurality of LED elements is employed, and a change in the hue of a color, or a change in a tone of a color, which is caused by the difference between the luminances for the LED elements, is utilized to indicate a plurality of sets of information.

In the above embodiment, luminance is controlled by changing the time ratio of ON time and OFF time for an LED device. But in addition to the control provided by setting the ON/OFF time, the luminance can be changed as follows.

Figure 17:
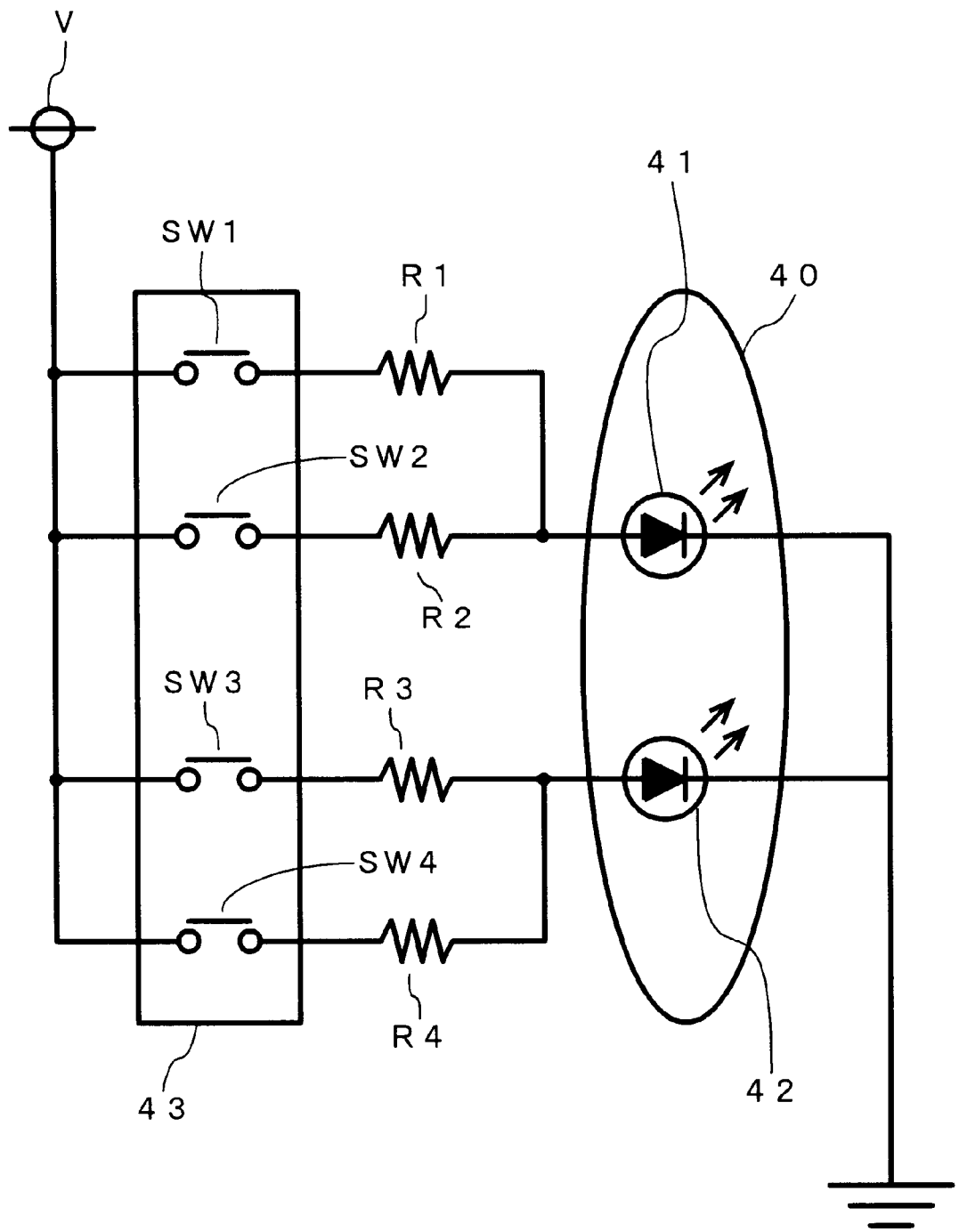
FIG. 17 is a diagram showing a circuit for controlling the luminance of the light emitted by an LED.

In FIG. 17 a modification for controlling the luminance of the light emitted by an LED device is shown. A display device 40 is a two-color LED device that includes a red LED element 41 and a green LED element 42. The red LED element 41 is connected to the power source V via resistors R1 and R2 and switches SW1 and SW2, and the green LED element 42 is also connected to the power source V via resistors R3 and R4 and switches SW3 and SW4. The cathodes of the LED elements 41 and 42 are grounded. The resistors R1 through R4 have the same resistance values, for example.

The switches SW1 through SW4 are preferably involved in an integrated circuit in which semiconductor switching devices are incorporated. A switch signal is transmitted by the CPU 1 to the switch section 43, and in response to the switch signal, the switches SW1 through SW4 are driven. At least one of the resistors R1 through R4, which are selected by changing the settings of the switches SW1 through SW4, determine the magnitude of the current that flows to the LED device 41 and/or 42, and therefore, control the color of the light on the display device 40. An operation for which a display device 40 is provided for each key will now be described.

Assuming that the fingering range for the right hand is displayed by using red at a low luminance and the range for the left hand is displayed by using green at a low luminance, when the position data for the right hand range are provided based on play data, in the display device 40 only the switches SW1 that correspond to keys which are specified by the position data are closed. Similarly, when position data for the left hand range are provided, in the display device 40 only the switches SW3 that correspond to keys that are specified by the position data are closed. Then, the display device 40 displays the range for the right hand in red color at a low luminance, and the range for the left hand in green color at a low luminance.

When the ranges for the right hand and the left hand overlap, in the display device 40 only the switches SW1 and SW3 that correspond to keys in the overlapping ranges are closed. Then, in this range, the display device 40 emits an orange light at a low luminance.

Further, assuming that the position of keys to be depressed for the right hand is indicated in red color at a high luminance and the position of keys to be depressed for the left hand is indicated in green color at a high luminance, when the position of keys to be depressed for the right hand is supplied based on play data, in the display device 40 only the switches SW1 and SW2 that correspond to the keys specified by the key position data are closed to turn on the LED element 41. Similarly, when the position of keys to be depressed for the left hand is supplied based on play data, in the display device 40 only the switches SW3 and SW4 that correspond to the keys specified by the key position data are closed to turn on the LED element 42. As a result, the display device 40 emits red light at a high luminance to indicate the position of keys to be depressed for the right hand, and green light at a high luminance to indicate the position of keys to be depressed for the left hand.

In the above switching example, it is assumed that the resistance values of the resistors R1 through R4 are the same. But even if the resistors R1 and R2, or the resistors R3 and R4, that have different resistances are employed, the settings of the switches SW1 through SW4 need only be changed in consonance with the desired luminances. That is, for a lower luminance, a resistor having a larger resistance is selected, while for a higher luminance, a resistor having a smaller resistance is selected.

As well as the first through the third embodiment, the structure, according to the present embodiment whereby the current flowing through the LED device is changed to obtain a desired light emission characteristic, can be employed not only for displaying the position of the hands and of position of keys to be depressed on the keyboard, but also for displaying touch data. The display device 40 in the present embodiment is a two-color LED; however, if the display device includes LED devices that emit light of color other than red and green, displays for many different kinds of data can be provided by the display device 40.

In addition to an LED display, another display device, such as a fluorescent display device or a liquid crystal display, can be used arbitrarily. The display device of the present invention can be applied not only to the fingering display device but also to a display device for displaying a desired plurality of sets of information. The display device of the present invention can enable the fade-in and fade-out of a display by changing the luminance as time elapses. The fingering guide display device of the present invention can be applied for a different kind of musical instrument having a keyboard, such as an electronic piano or a muffled sound piano. In this case, the luminance and the color hues can be controlled in consonance with key touch and an envelope.

According to the present invention, the display device can be controlled in the luminance and/or the color hues using a simple structure, and a plurality of sets of information can be displayed, for example, by using a single LED. Since the luminance can be determined by referring to the initial value of a parameter when the display begins, a processing load for controlling the luminance during the display can be reduced. When the display device is adopted as a fingering guide display device for a keyboard instrument, the information for a key to be depressed and other play guide information can be displayed at the same time using a simple structure.

What is claimed is:

1. A display device for use with a keyboard instrument comprising:

display means employing light emission, the display means corresponding to keys on a keyboard instrument;

drive means for turning on/off the display means; and control means being responsive to a display instruction which sets a display time period for a note within a musical piece and to a light emission characteristic instruction which designates a light emission characteristic of the display means that is decided based on a time ratio of an ON period to an OFF period;

wherein the control means causes the drive means to turn on and off the display means a plurality of times during the display time period for a note according to the time ratio corresponding to the light emission characteristic decided.

2. A display device according to claim 1 wherein the control means supplying the drive means with a control signal for causing the display means be in an ON state or an OFF state for a first predetermined number n of display cycles during a second predetermined number N (N≧n) of display cycles, and the n and N being natural number.

3. A display device according to claim 2 wherein the second number N of display cycles are all different from each other in duration time.

4. A display device according to claim 1 wherein the light emission characteristic is at least one of hue, luminance, tint, and cast.

5. A display device according to claim 1, wherein any OFF period between two successive ON periods is set to be short enough for human eyes not to discern flicker of light emission.

6. A display device according to claim 1 wherein the display means comprises a plurality of light emitting elements with colors different from each other, and the drive means is capable of independently driving each of the light emitting elements.

7. A display device according to claim 1 wherein the display means comprises an LED device.

8. A keyboard instrument comprising:

a keyboard;

display means including a plurality of light emitting elements respectively corresponding to a plurality of keys on the keyboard and employing light emission;

drive means for turning on/off the display means; and control means being responsive to a display instruction which sets a display time period for a note within a musical piece and to a light emission characteristic instruction which designates a light emission characteristic of the display means that is decided based on a time ratio of an ON period to an OFF period;

wherein the control means allocates differing time ratios of ON periods to OFF periods to the display means to cause the drive means to turn on and off the display means a plurality of times during the display time period for a note according to the time ratios corresponding to the light emission characteristic decided and the differing time ratios allocated, so that position data for a key to be depressed and at least one set of another playing guide information are displayed at the same time with light emission characteristics different from each other.

9. A keyboard instrument according to claim 8 wherein other playing guide information including at least one of fingering data and touch data.

10. A keyboard instrument according to claim 8 wherein the control means supplying the drive means with a control signal for causing the display means be in one of an ON state and an OFF state for a first predetermined number n of display cycles during a second predetermined number N (N≧n) of display cycles, and the n and N being natural numbers.

11. A keyboard instrument according to claim 8 wherein the display means is continuously turned on to show the position data for a key to be depressed by setting the time ratio for the ON period to 100% and the display means is intermittently turned on to show said other playing guide information by setting the time ratio for the ON period to be less than 100%.

12. A keyboard instrument according to claim 8 wherein the display means comprises a plurality of light emitting elements with colors different from each other, and the drive means is capable of independently driving each of the light emitting elements.

13. A keyboard instrument according to claim 8 wherein the light emission characteristic is at least one of hue, luminance, tint, and cast.

14. A keyboard instrument according to claim 10 wherein the second number N of display cycles are all different from each other in duration time.

15. A display device comprising:

light emitting display means that includes a plurality of light emitting elements for emitting different colored lights;

drive means for independently driving said light emitting elements that are selected; and control means for controlling said drive means so that, in consonance with a light emission characteristic instruction, a current is supplied to at least one of the light emitting elements and the current has a magnitude set to one of a plurality of predetermined values;

wherein the control means, being responsive to a display instruction which sets a display time period for a note within a musical piece and to a light emission characteristic instruction which designates a light emission characteristic of the light emitting display means that is decided based on a time ratio of an ON period to an OFF period, causes the drive means to turn on and off the light emitting display means a plurality of times during the display time period for a note according to the time ratio corresponding to the light emission characteristic decided.

16. A keyboard instrument comprising:

light emitting display means, individually provided for corresponding to a plurality of keys on a keyboard, that includes a plurality of light emitting elements for emitting different colored lights;

drive means for independently driving said light emitting elements that are selected; and control means for controlling said drive means so that, in consonance with a light emission characteristic instruction, a current is supplied to at least one of the light emitting elements and the current has a magnitude set to one of a plurality of predetermined values, wherein the position data of the keys to be depressed is provided as a light emission characteristic instruction and at least one set of another play guide data is provided as a different light emission characteristic instruction; and wherein the control means, being responsive to a display instruction which sets a display time period for a note within a musical piece and to a light emission characteristic instruction which designates a light emission characteristic of the display means that is decided based on a time ratio of an ON period to an OFF period, causes the drive means to turn on and off the display means a plurality of times during the display time period for a note according to the time ratio corresponding to the light emission characteristic decided.

17. A keyboard instrument according to claim 16, wherein either fingering data or touch data, at least, are included in said other play guide data.

18. The display device of claim 1, wherein the time ratio of the ON period to the OFF period is less than 100%.

19. The keyboard instrument of claim 16, wherein each key of the plurality of keys has the plurality of light emitting elements for emitting different colored lights, wherein a first light emitting element emits a first colored light, a second light emitting element emits a second colored light different from the first and the first and second light emitting elements together emit a third colored light different from the first and second colored lights.

* * * * *